March 8, 1966 W. J. ODOM, JR., ETAL 3,239,754

THIN FILM MAGNETOMETER

Filed Oct. 9, 1963 4 Sheets-Sheet 1

INVENTORS
WILLIAM J. ODOM, JR.
FORREST G. WEST, JR.
BY
ATTORNEY

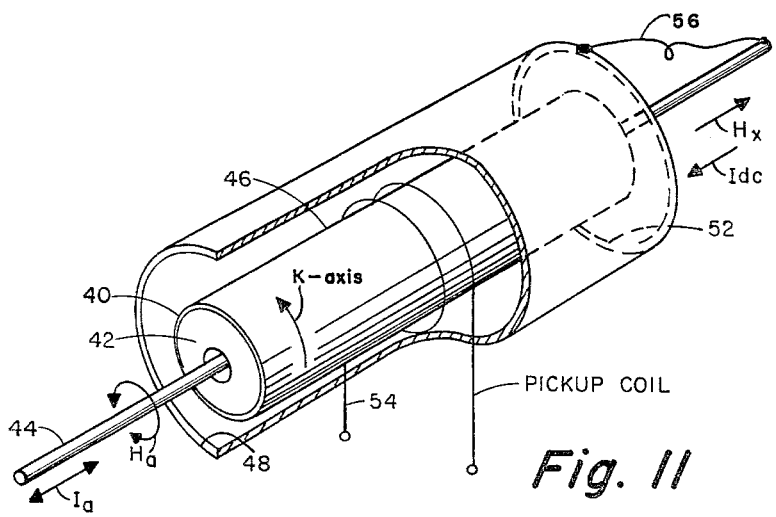
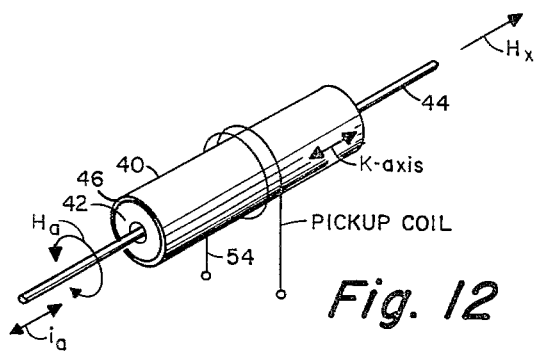

United States Patent Office 3,239,754
Patented Mar. 8, 1966

3,239,754
THIN FILM MAGNETOMETER
William J. Odom, Jr., Richardson, and Forrest G. West, Jr., Dallas, Tex., assignors to Texas Instruments Incorporated, Dallas, Tex., a corporation of Delaware
Filed Oct. 9, 1963, Ser. No. 315,061
29 Claims. (Cl. 324—47)

This invention relates to highly sensitive instruments for detecting and measuring the direction and intensity of magnetic fields which may be either constant or rapidly varying with respect to time up to frequencies extending into the megacycle region. This application is a continuation-in-part of our copending U.S. Patent application, Serial No. 106,824, filed May 1, 1961, now abandoned.

According to one form or type of prior art magnetometer, two long thin cores of magnetic material are provided with primary and secondary windings and mounted in parallel relation. The primary windings are wound in opposite directions as are the secondaries. The primary windings are connected in parallel and energized by an oscillatory voltage to drive the cores to saturation in opposite directions. This induces second harmonic voltages in the secondary winding of each core. An external magnetic field parallel to the cores will cause the second harmonic voltages generated in the secondary windings to be shifted in phase relative to one another due to the change in the magnetization curve of the cores in the presence of the magnetic field. The difference in phase of the second harmonic voltages produces output pulses of an amplitude related to the intensity of the external magnetic field.

In still another type of prior art magnetometer, a single elongated core of magnetic material is wound with primary and secondary windings. When the ambient magnetic field contains a component lying along the axis of the core, second harmonic voltages will be developed in the secondary winding of an amplitude dependent upon the intensity of the component of the ambient magnetic field along the axis of the core.

In both of the above described prior art devices utilizing bulk ferromagnetic cores, an upper limit is imposed on the frequency of the magnetic field which the devices are capable of detecting because of the generation of eddy currents. Another limitation on the above described ferromagnetic core type magnetometers is imposed by the fact that the magnetization process is one of domain wall motion. Since this process is inherently slow, the frequency response of the bulk ferromagnetic core is not as good as it might be if magnetization by domain rotation predominated.

Further, although core materials capable of operation at relatvicly high frequencies are available, the directional sensitvity of the above described magnetometers is limited because of the uncertainty in the location of the preferred magnetic axis.

Still another type magnetometer is the resonance type, for example, the sodium vapor or helium magnetometer. In the resonance type magnetometer, certain atoms in an energy state such that the atoms have a magnetic moment but no orbital angular momentum are placed in a magnetic field of sufficient strength to cause the energy state to divide into two or more energy levels. The number of energy levels produced is dependent on the magnetic moment of the atoms used. The amount of separation between energy levels depends upon the strength of the magnetic field in which they are placed. Once the separate energy levels are established and an unequal population distribution between levels created, the frequency of the electromagnetic energy that will disturb the population distribution between the levels is dependent upon the strength of the magnetic field producing the different levels. The term resonance magnetometers is used because a particular resonant frequency will disturb the population distribution toward equality, producing an observable effect characteristic of the resonance. This resonant frequency is monochromatic to an extent determined by various relaxation processes associated with the creation and destruction of the magnetically affected energy levels; therefore variations in the intensity of the magnetic field are reflected by a change in the resonance frequency capable of disturbing the population distributions, the accuracy of resolution of frequencies and therefore magnetic fields near resonance will depend on the degree of monochromaticity of the resonance, commonly referred to as the line width. By determining the frequency of the energy that will disturb the population of the energy levels, it is possible to obtain a determination of the magnetic field strength to an accuracy directly related to the line width and inversely to the signal-to-noise ratio of the resonance effect.

Although the resonance type magnetometers are quite sensitive, they also are subject to limitations. One limitation of the resonance type magnetometer is that the signal-to-noise ratio is very low when used to detect magnetic fields which vary at a frequency greater than the width of the resonance line. Another limitation to the resonance type magnetometer is that the signal-to-noise ratio is significantly reduced if the ambient magnetic field is of low intensity relative to the resonance line width because it is necessary that the magnetic field be of sufficient strength to produce separation of the energy levels without overlap.

The magnetometer of the present invention overcomes many of the disadvantages and inherent limitations of the prior art magnetometers. In the magnetometer of the present invention, the detection process is one wherein the process of domain rotation is disturbed. Theoretically, any level of magnetic field will disturb the domain rotation in a ferromagnetic film, and therefore, theoretically, any level of magnetic field can be detected. As a practical matter, the lower limit of the field strength which can be detected is determined entirely by the signal-to-noise ratio of the detection system.

The present invention resides in the discovery that a superior magnetometer can be constructed using a ferromagnetic film core whose anisotropy energy is purely uniaxial; that is, the uniaxial anisotropy energy is large compared to the other magnetic free energies. The magnetometer of the present invention is an improvement over prior art devices in that its sensitivity to very small ambient fields is such that ambient fields in the range of 10$^{-6}$ oersted or less can be measured. Furthermore, the response of the present magnetometer is such that it can detect changes in ambient fields that occur in times less than 10$^{-6}$ second.

In accordance with the present invention, the ferromagnetic film core is of a shape that defines a general cylinder, where a general cylinder is defined as the surface generated by a straight line moving around another straight line, the two lines always remaining parallel. The path of any point on this generated surface may be any curved line and does not have to be a circle, nor is the surface necessarily closed. The thin ferromagnetic film is deposited onto a substrate in the presence of a magnetic field such that the anisotropy axis (easy axis) is either parallel or normal to the axis of the general cylinder. A pick-up coil is wound about the ferromagnetic film core with the axis of the pick-up coil parallel to the axis of the general cylinder. The diameter of the general cylinder is much greater than the thickness of the ferromagnetic film.

In accordance with one preferred embodiment of the invention, the field sensitive element is of planar configuration. The pick-up coil may be oriented either normal or parallel to the anisotropy axis of the element.

In accordance with another preferred embodiment of the present invention, the field sensitive element is of coaxial construction wherein the thin ferromagnetic film is deposited onto a tubular substrate which defines a right circular cylinder. As mentioned above, the thin magnetic film can be deposited with the easy or anisotropy axis either parallel or normal to the axis of the cylinder. In either case, the pick-up coil is wound about the cylindrical element such that the axis of the pick-up coil is parallel to the axis of the cylinder.

Due to the shape anisotropy of a thin ferromagnetic film shaped to define a general cylinder, high directional sensitivity is provided. However, the embodiment wherein the film defines a right circular cylinder is somewhat more directionally sensitive than the planar embodiment in most practical applications because alignment between the various critical axes is more easily obtained. The field sensitive element can be made small and light of weight, yet of rugged construction.

A description of several preferred embodiments of the invention follows with special reference to the drawings in which.

Figure 1:
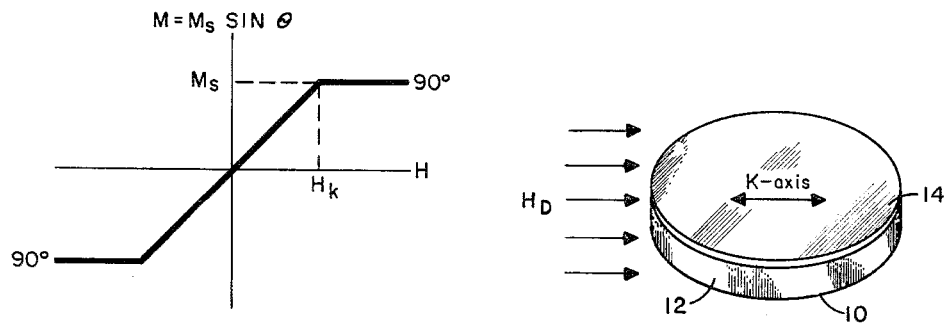
FIGURE 1 shows the magnetization curve of a thin ferromagnetic film used in practicing the present invention with the magnetic field applied normal to the anisotropy axis (K-axis)

FIGURE 11 illustrates a coaxial field sensitive element provided according to a second embodiment of the invention wherein the anisotropy axis is formed normal to the axis of a right circular cylinder; and FIGURE 12 illustrates a coaxial cylindrical field sensitive element according to the second embodiment of the invention wherein the anisotropy axis is formed parallel to the axis of the cylinder.

As mentioned before, the improved magnetometer of the present invention utilizes a field sensitive element comprising a thin ferromagnetic film characterized by a high degree of uniaxial anisotropy. This anisotropy can be expressed mathematically by requiring that the magnetic energy per unit volume, $F(\theta)$, in the absence of an applied magnetic field, be given by the relation:

$$F(\theta) = K \sin^2 \quad (1)$$

where $\theta$ is the direction of the magnetization within the unit volume with respect to a preferred axis. For positive K, the anisotropy constant, it is seen that $F(\theta)$ is a minimum for $\theta = 0$ or $\pm\pi$. Thus, the preferred axis is an equilibrium direction of magnetization, since the directions $\theta = 0$ or $\pm\pi$ define equilibrium positions for the magnetization in the absence of an applied field.

If the energy $F(\theta)$ is the only free magnetic energy term for a specimen of ferromagnetic material, or if $F(\theta)$ is much larger than the other sources of free magnetic energy, the specimen will tend to be magnetized as a single domain, i.e., the magnetization throughout its volume will be uniform in either the 0 or $\pm\pi$ directions. Since it is desirable for the energy $F(\theta)$ to be at a low level in order that the device may exhibit good sensitivity characteristics, the other sources of free magnetic energy should be small. It is further necessary that the material have as high saturation magnetization as is consistent with the above requirements.

The three other sources of free magnetic energy usually considered are the magnetocrystalline anisotropy, the magnetoelastic anisotropy, and the shape anisotropy energies.

An evaporated film deposited or annealed in the presence of a uniform magnetic field parallel to the plane of the film has been found to have a preferred or anisotropy axis, designated as the K-axis, in the plane of the film. For such film, the $\theta = 0$ or $\pm\pi$ direction is parallel to the field present during deposition and Equation 1 applies, where $\theta$ defines the direction of the magnetization in the plane of the film. For a discussion of the magnetic phenomena of thin films of this type, reference may be had to an article entitled "Magnetic Relaxations in Thin Films" by D. O. Smith in the proceedings of the 1956 Conference of Magnetization and Magnetic Materials, AIEE.

When a uniform magnetic field H is applied to a uniaxially anisotropic film as above described in the plane thereof and normal to the preferred direction, the saturation magnetic moment per unit volume $M_s$ will be in a new equilibrium position determined by minimizing the energy equation:

$$F(\theta) = K \sin^2 \theta - HM_s \sin \theta \quad (2)$$

The component M which lies in the direction of H is given by $$M = M_s \sin \theta \quad (3)$$

If the incremental magnetic susceptibility in the direction of H is defined by the relation $$X = \frac{dM}{dH} \quad (4)$$

then it is easily shown from Equations 2, 3, and 4 that $$X = \frac{M_s^2}{2K} \quad (5)$$

for $$H < \frac{2K}{M_s}$$

and X is a constant independent of H. It can further be easily seen that for $$H > \frac{2K}{M_s}, \quad \theta = \frac{\pi}{2}$$

is an equilibrium position for $M_s$; i.e., $M_s$ lies in the direction of the field. Therefore, $X = 0$ for $$H > \frac{2K}{M_s}$$

From these results one sees that the magnetization curve has the shape shown in FIGURE 1. The slope of the curve is the susceptibility of the film in a direction normal to the direction of the K-axis and is given by $$Xn = \frac{M_s}{H_k}$$

Here $H_k$ is that value of magnetic field, applied normal to the K-axis, required to rotate the magnetization vector of a fully-magnetized film 90° from the K-axis.

Figure 2:
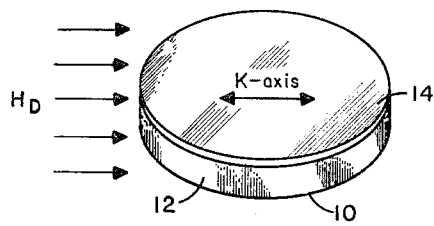
FIGURE 2 is a perspective view illustrating a planar field sensitive element according to one embodiment of the present invention.

Turning now to FIGURE 2 of the drawings, a specific example of a field sensitive element utilizing a thin ferromagnetic film as described above is shown. The element 10 can be seen to include an optically ground substrate 12, for example glass, which is formed to define a thin circular planar disk. A thin film 14 of ferromagnetic material having the characteristics described above is deposited onto the substrate 12 in the presence of a magnetic field $H_d$ which is parallel to the plane of film 14. The film 14 may be deposited using conventional techniques such as evaporation, sputtering or electrodeposition. The K-axis of the film is in the plane of the film 14 and parallel to the magnetic field $H_d$.

A film of nickel-iron alloy containing approximately 82% nickel and 18% iron is an example of a ferromagnetic film material that exhibits a high ratio of uniaxial anisotropy compared to the other sources of free magnetic energy. It must be noted, however, that other film materials exhibiting uniaxial anisotropy in keeping with the aforementioned requirements can be used.

To reduce the free magnetic energy due to shape anisotropy to a low value and to reduce the effects of eddy currents, the film should have a thickness less than about $10^{-4}$ cm. However, the film is suitably at least $10^{-5}$ cm. thick to maintain the sensitivity of the device. The radius of the general cylinder which the element defines must be large compared to the thickness of the film.

Figure 3:
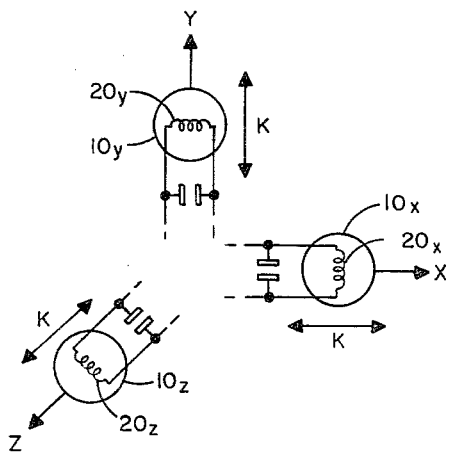
FIGURE 3 shows a 3-axis magnetometer array utilizing the field sensitive element of the present invention.

In one form of magnetometer utilizing a field sensitive element 10 as described above, coils 20x, 20y, and 20z are wound about the cores 10x, 10y, and 10z as shown in FIGURE 3, with the axis of each coil in the plane of the core and perpendicular to the K-axis of the film as designated by the arrows. If the element is planar and the axis of the coil is in the plane of the core, the axis of the coil will be perpendicular to the axis of the general cylinder of which the planar element is a portion. The film cores carrying the coils are mounted in such a way that the K-axis of each film is orthogonally related to each of the other axes and lies in the x, y, and z planes respectively. The coils may be wound about the cores or formed by a conductive strip secured to or deposited thereon in any well-known manner and insulated therefrom.

Figure 4:
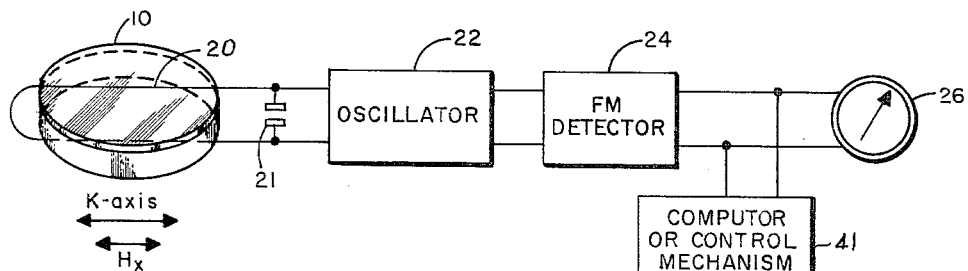
FIGURE 4 illustrates a field sensitive element according to the present invention operating in the frequency modulated mode.

FIGURE 4 shows one coil and core assembly of FIGURE 3 with means for indicating the strength of an ambient magnetic field $H_x$. The coil 20 is coupled to oscillator 22. The coil 20 and the distributed capacity 21 of the coil and transmission line form a tuned parallel circuit which functions as the frequency determining tank circuit of oscillator 22, the coil being tuned to a reference frequency in the absence of an ambient magnetic field.

In the presence of a biasing magnetic field, the permeability of each of the films in a direction normal to the K-axis assumes a value dependent on the intensity of a component $H_x$ of the field in the plane of the film and in the direction of the K-axis. It can easily be shown that the susceptibility of the film in the direction normal to the K-axis in the presence of the magnetic field $H_x$ parallel to such axis is given by $$X_1 = \frac{X_n}{1 + \frac{H_x}{H_k}}$$

As above, $H_k$ is that value of magnetic field, applied normal to the K-axis, required to rotate the magnetization vector of a fully magnetized film 90° from the K-axis. Since the normal permeability of the film is $$\mu n = 1 + 4\pi X_n$$

the effective permeability under the above conditions, is $$\mu_e f f = 1 + 4\pi f \frac{X_n}{1 + H_x H_k}$$

where $f$=filling factor of the coil. Therefore, the inductance of the coil is given by $$L = \mu eff L_a$$

where $L_a$ is the inductance of the coil in air. Thus, the inductance of the coil is a function of the field $H_x$, and this effect can be used to detect the intensity of a magnetic field component along the K-axis by the change in frequency of the oscillator as a result of the change in inductance of the coil. An FM detector 24 is coupled to the oscillator, to provide an output of an amplitude related to the departure of the frequency thereof from the reference frequency. An indicator 26, which is suitably a frequency meter calibrated in magnetic units, indicates the strength of the component of the magnetic field parallel to the K-axis of the field sensitive element 10. Each of the coils of FIGURE 3 is coupled to an oscillator 22, detector 24 and indicator 26 in the manner shown in FIGURE 4.

Figure 5:
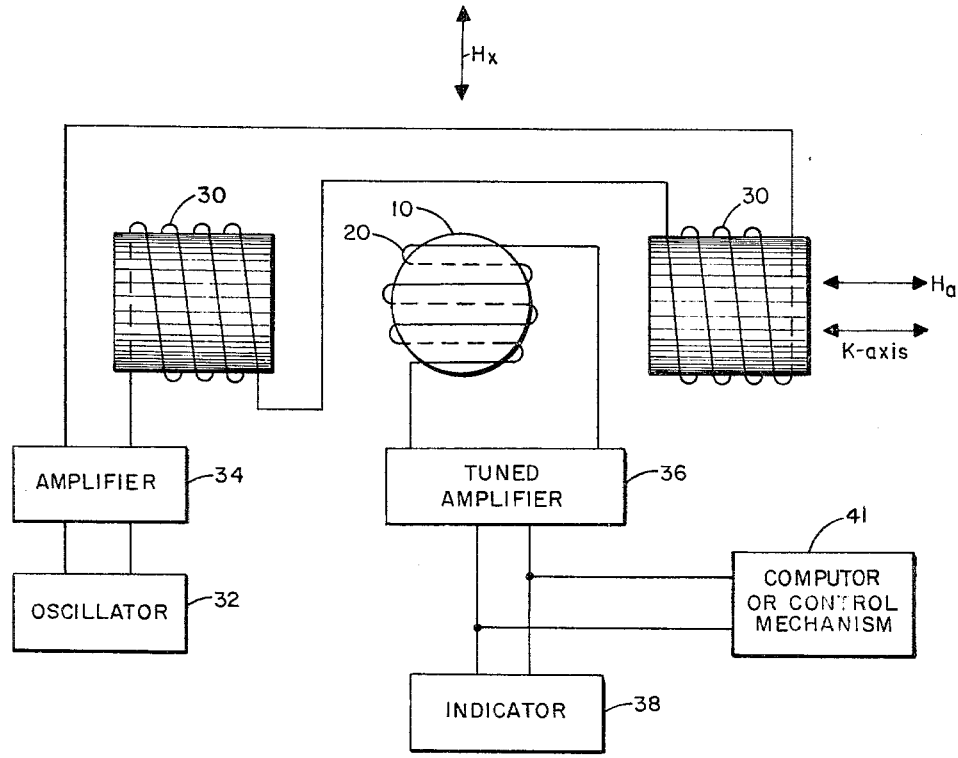
FIGURE 5 illustrates a field sensitive element according to the present invention operating in the amplitude modulated mode.

A second embodiment of the invention utilizing the above described field sensitive element 10 having uniaxial anisotropy is shown in FIGURE 5. In this form of the invention, with reference to a single one of the magnetometers of a three-axis array, a high frequency alternating magnetic field designated as an exciting field $H_a$ is applied to the film in the plane thereof and parallel to the direction of its K-axis as shown by the arrow. The exciting field may be provided by a coil 30 either mounted on or adjacent the element 10. The coil 30 is energized by a high frequency oscillator 32 through an amplifier 34. The pick-up coil 20 is wound about the element 10 with its axis in the plane of the film and normal to the exciting field $H_a$. The film reverses its magnetization direction each time the exciting field provided by coil 30 reverses. If the exciting field $H_a$ is accurately parallel to the K-axis and normal to the axis of the pick-up coil, there will be a minimum output from the pick-up coil. If an ambient magnetic field designated as $H_x$, the intensity of which is to be measured, is applied perpendicular to the K-axis, an output will be derived from the pick-up coil 20 of an amplitude dependent on the intensity of the field $H_x$.

In general, the magnetization process is a combination of both domain rotation and domain wall motion. At low frequencies, the domain wall motion predominates if the magnetic field is of sufficient intensity. If the magnetic field varies at high frequencies, the magnetization process is predominantly one of domain rotation. At intermediate frequencies domain rotation and domain wall motion are both operating. However, it is important to note that some domain rotation is always occurring and that there is no critical field strength required to disturb it.

Figures 6A, 6B:
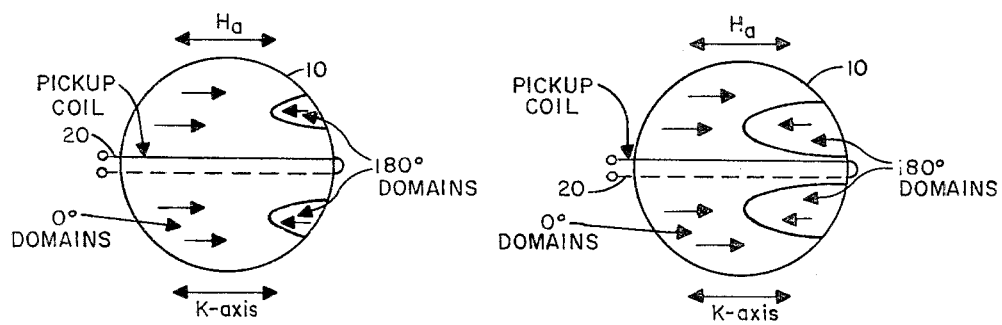
FIGURES 6a and 6b illustrate the manner in which the domain walls move in the element shown in FIGURE 2 when the element of FIGURE 2 is subjected to an alternating magnetic field $H_a$ in the plane of the film and parallel to the K-axis.

The phenomenon of domain wall motion may be understood by reference to FIGURES 6a and 6b. Thin films of the type possessing a preferred axis of magnetization may have domains magnetized in two directions in the same film. The 0° and 180° domains are separated by the domain walls. When an alternating external magnetic field $H_a$ is applied in the 180° direction, the domain walls move out and enlarge the 180° domains at the expense of the 0° domains. Because of their extreme thinness, the films are much more sensitive to external magnetic fields in the plane of the film than those perpendicular to the plane, by a factor of perhaps a thousand to one. When the domain wall moves, it does so by the reversal within the wall of magnetic dipoles in a plane perpendicular to the plane of the film. Upon reversal of the alternating field $H_a$, the film reverses its magnetization direction. In the absence of any field normal to the K-axis, the change of flux is perpendicular to the axis of the pick-up coil 20, the winding is not intercepted by the varying flux and the output from the coil is a minimum.

Figure 7:
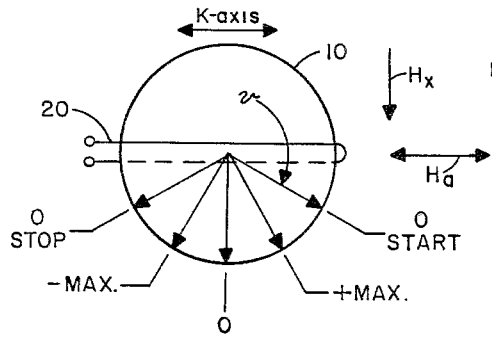
FIGURE 7 illustrates the manner in which an ambient magnetic field applied normal to the K-axis of the field sensitive element causes the local domain magnetization vectors to be pulled in the direction of the ambient magnetic field.

If, however, an ambient magnetic field $H_x$ to be measured is applied perpendicular to the K-axis and in the film plane, the local domain magnetization vectors of the film are each pulled in the direction of the field $H_x$. Such a field $H_x$ changes the direction of magnetization by rotation of the magnetic dipoles in the plane of the film and this process occurs throughout the entire film. Referring to FIGURE 7 when a field having a value of $H_x$ is applied perpendicular to the K-axis in the plane of the film, the local domain magnetization vectors such as the vector $v$, will each be pulled in the direction of the field $H_x$ and the reversal due to the alternating field $H_a$ will take place partially by wall motion and partially by domain rotation.

Figure 8:
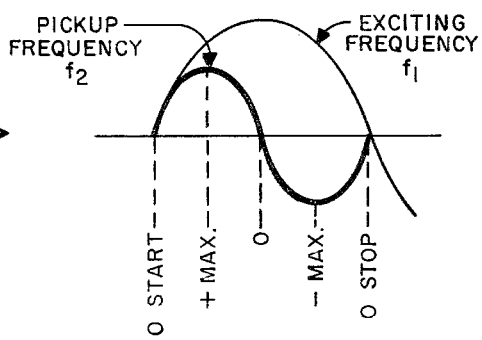
FIGURE 8 illustrates the manner in which rotation of the domain magnetization vectors due to the presence of an ambient magnetic field induces a second harmonic alternating voltage in the pick-up coil.

The domain magnetization vectors will then rotate in the plane of the film inducing a second harmonic alternating voltage in the pick-up coil, as shown in FIGURE 8. The amplitude of the second harmonic voltage will, of course, depend on the intensity of the component of the magnetic field $H_x$ normal to the K-axis, since as the magnitude of $H_x$ increases, a greater component of the magnetization vectors will rotate in the plane of the film. By accurately positioning the axis of the exciting coil 30 (FIGURE 5) perpendicular to the axis of the pick-up coil 20, the amount of exciting field $H_a$ coupled into the pick-up coil is a minimum. The exciting frequency is unwanted in the pick-up coil because it gives no information about the ambient magnetic field being measured and can saturate the detecting instrument and possibly produce other harmonics which would degrade the signal of interest. An amplifier 36 coupled to the output of pick-up coil 20 is tuned to the second harmonic of the exciting voltage which produces the alternating magnetic field $H_a$. An indicator 38 coupled to the output of the amplifier 36 provides an indication of the intensity of the magnetic field $H_x$. A three-axis array similar to that of FIGURE 3 but using field sensing devices according to FIGURE 5 may be provided. The outputs of the amplifiers of such an array may of course be applied to a computer 41 to obtain the quadrature of the magnetic field components and hence the total field.

Figure 10A:
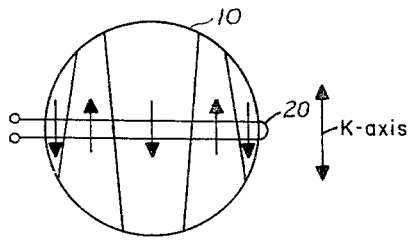
FIGURES 10a, 10b and 10c illustrate the manner in which an alternating magnetic field applied normal to the anisotropy axis will cause domain magnetization vectors to rotate in the plane of the film.
Figure 10B:
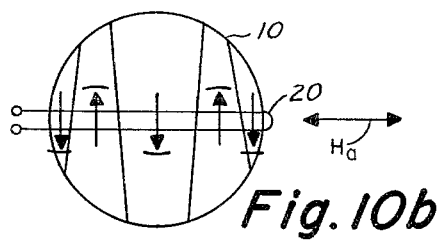
Figure 10C:
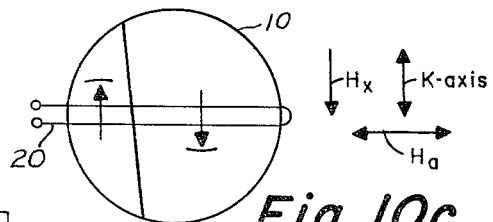
Figure 9:
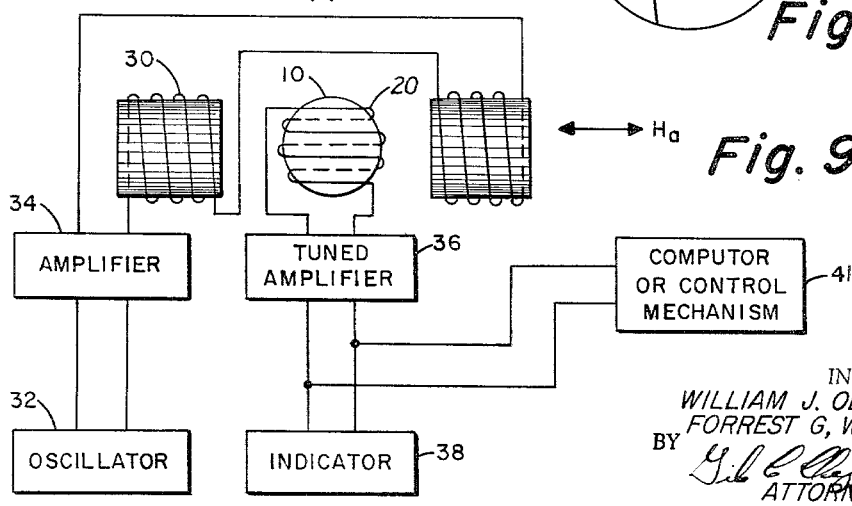
FIGURE 9 illustrates the field sensitive element of the present invention operating in the amplitude modulated mode.

In a modified form of the arrangement shown in FIGURE 9, the exciting field may be applied to the planar film core in a direction normal to the K-axis of the core. In this arrangement, the pick-up coil 20 wound on the core has its axis in the plane of the film and in the direction of the K-axis of the film core, to detect an ambient magnetic field in the plane of the core parallel to such K-axis. Experimentally, it has been found that when the amplitude of the exciting alternating magnetic field $H_a$ is comparable to $H_K$ and accurately perpendicular to the K-axis, as explained above, the pick-up coils give minimum output from the film. This phenomenon can be explained by reference to FIGURES 10a and 10b. It has been found that the film, after having been subjected to a decreasing magnetic field $H_a$ applied perpendicular to the K-axis, becomes demagnetized. In such case, the 0° and 180° domains are evenly divided in the film as shown in FIGURE 10a. Consequently, when the exciting field $H_a$ is next applied, the domain magnetization vectors rotate in the plane of the film as shown in FIGURE 10b. One domain will increase the magnetic flux through the pick-up coil 20 in one direction and the adjacent domain will increase the magnetic flux in the opposite direction, thus canceling out the two effects in the pick-up coil 20. Now, if a magnetic field $H_x$ to be sensed is applied perpendicular to the exciting field $H_a$ as shown in FIGURE 10c, there will be an output in the pick-up coil 20 because the film will acquire a net magnetization in the direction of $H_x$; that is, there will be a growth of the magnetic domains in the direction of the ambient field $H_x$ in the direction of the K-axis. There is a result of the tendency for domains to return from their extreme position so as to align with $H_x$. The stronger $H_x$ is, the greater this tendency, and consequently the output from the pick-up coil is increased. The output of the pick-up coil is a second harmonic of the exciting frequency as explained above in connection with FIGURES 7 and 8, the amplitude of the output depending on the strength of the magnetic field $H_x$.

FIGURE 11 illustrates still another configuration for a field sensitive element utilizing a thin magnetic film characterized by being uniaxially anisotropic. The field sensitive element 40 shown in FIGURE 11 is of coaxial construction and possesses several advantages over the planar type element 10 shown in FIGURE 2 of the drawings.

The field sensitive element 40 suitably comprises a tubular glass substrate 42 through which a conductor 44 passes. The thin magnetic field 46 is deposited onto the glass substrate by evaporation, sputtering or electro-deposition or other suitable method. If the K-axis is to be normal to the axis of the cylindrical tube 42, the necessary magnetic field for producing a uniform magnetic field parallel to the surface of the tube 42 can be obtained by passing a constant direct current $I_{dc}$ through the conductor 44. It will be appreciated that the K-axis is circumferential and never intersects the axis. At a point, however, the K-axis will be normal to a plane including the point and the axis of the cylinder and such a meaning is intended when the K-axis is described as being normal to the axis of the cylinder or coil. The pick-up coil 54 is suitably wound directly onto the field sensitive element 40, using the cylindrical field sensing element as a coil form. If desired, the field sensitive element 40 can be encased in a shielding member 48 which is electrically connected to the conductor 44, suitably by a conductor 56.

As described previously with reference to FIGURES 6a and 6b, when the domain wall moves, it does so by reversal within the wall of magnetic dipoles in a plane perpendicular to the film. Upon reversal of the alternating field $H_a$, the film reverses its magnetization direction and in the absence of any field normal to the K-axis, the change in flux is perpendicular to the axis of the pick-up coil 20 in FIGURE 6 or pick-up coil 54 in FIGURE 11. Since the winding of the pick-up coil 20 or 54 is not intercepted by the varying flux, the output of the coil is a minimum. If the film 44 in FIGURE 11 is subjected to an ambient magnetic field $H_x$ to be measured which is applied perpendicular to the K-axis and in the plane of the film, the local domain magnetization vectors of the film are each pulled in the direction of the field $H_x$. Such a field $H_x$ changes the direction of magnetization by rotation of the magnetic domains in the plane of the film and this process occurs throughout the entire film. The local domain magnetization vectors will each be pulled in the direction of the field $H_x$ and reversal due to the alternating field $H_a$ will take place partially by a wall motion and partially by domain rotation. The domain magnetization vectors will then rotate in the plane of the film inducing a second harmonic alternating voltage in the pick-up coil as described with reference to FIGURE 8. Thus, it is seen that the cylindrical field sensitive element 40, wherein the film is applied in a magnetic field to produce a K-axis which circumscribes the cylindrical element and is normal to the axis of the element, is similar to and operates in the same manner as a planar element 10 having a K-axis oriented with respect to the pick-up coil as shown in FIGURES 6a and 6b, and as such, can be used in a magnetometer system such as shown in FIGURE 5.

If desired, auxiliary coils may be utilized to provide a uniform magnetic field parallel to the axis of the tubular member 42 as the film 46 is deposited, in which event the K-axis will be oriented parallel to the axis of the cylinder as shown in FIGURE 12. In such an element, the alternating field $H_a$ will be applied perpendicular to the K-axis when current $I_a$ flows through the conductor 44. The operation of such an element is similar to that described previously with respect to FIGURES 4 and 9. Thus, if the film is subjected to a magnetic field applied perpendicular to the K-axis and the field is reduced from saturation, the film splits into roughly anti-parallel domains and becomes demagnetized. In such a case, the 0° and 180° domains are evenly divided in the film. Consequently, when the exciting field $H_a$ is next applied, the domain magnetization vectors rotate in the plane of the film as described previously with reference to FIGURE 10b. One domain will increase the magnetic flux through the pick-up coil 20 in one direction and the adjacent domain will increase the magnetic flux in the opposite direction, thus canceling out the two effects in the pick-up coil 54. If a magnetic field $H_x$ to be sensed is applied perpendicular to the exciting field $H_a$ and along the plane of the film 46 parallel to the K-axis, there will be an output in the pick-up coil 54 because the film will acquire net magnetization in the direction of $H_x$, as shown in FIGURE 10c; that is, there will be a growth of the magnetic domains in the direction of the ambient field $H_x$ along the direction of the K-axis. Thus, as described previously with respect to FIGURE 10c, the tendency is for domains to return to their extreme positions so as to align with $H_x$. The stronger the $H_x$ is, the greater the tendency to align and, consequently, the output from the pick-up coil is increased. The output of the pick-up coil is a second harmonic of the exciting frequency as described previously, the amplitude of the output depending upon the strength of the magnetic field $H_x$.

In general, the detector of FIGURE 9 is preferred to the embodiments shown in FIGURES 4 and 5, as experimental results indicate that it is the most sensitive. The cylindrical element 40 is preferred to the planar element 10. The coaxial construction of the cylindrical field sensitive element 40 provides many advantages over a planar field sensing element such as the element 10. It will be apparent from the foregoing description that it is extremely important that the exciting field $H_a$, the ambient field to be measured $H_x$, the axis of the pick-up coil 20 and the K-axis of the film be aligned to a high degree of accuracy. The structure provided by the element 40 of FIGURES 11 and 12 insures that such alignment will be obtained in that the conductor 44 extends directly along the axis of the tubular member 42, insuring that the exciting field $H_a$ will be produced in the plane of the film 46 and in a direction perpendicular to the axis of the cylinder. Since the pick-up coil 54 is wound directly onto the cylindrical element 40, the axis of the coil will necessarily coincide with the axis of the cylinder, insuring that the axis of the pick-up coil 54 will be perpendicular to the exciting field $H_a$. If the film 46 is deposited while at the same time a steady D.C. current is passed through the conductor 44, the prevailing magnetic field during deposition and hence the K-axis of the magnetic film will be accurately located in a plane perpendicular to the axis of the cylinder. On the other hand, if the K-axis is desired to be formed such that it is oriented parallel to the axis of the cylinder, as described with reference to FIGURE 12, the construction shown is especially suitable for positioning the element 40 along the axis of two auxiliary coils (not shown) such that the magnetic field present during deposition of the film will pass through the plane of the film and in a direction parallel to the axis of the cylinder. Thus, the coaxial arrangement provided by the field sensing element 40 of FIGURES 11 and 12 is much easier to construct mechanically and assures more accurate alignment of the exciting field conductor, the magnetic film, and the pick-up coil. Another important advantage of the coaxial arrangement is that it is inherently better suited for high frequency operation, an important factor in increasing sensitivity and response to more rapid variations in $H_x$, the ambient field to be measured. The field sensing element 40 which utilizes a coaxial arrangement makes it possible to construct a more compact sensing head than is possible using the planar type element, and by utilizing the outer coaxial shield 50, the stray high frequency fields associated with the exciting field $H_a$ may be eliminated.

It is well-known that the sensitivity of second harmonic detection in general and as performed by the magnetometers of the prior art devices is a direct function of the frequency of the excitation field applied to drive the core. It is therefore an outstanding advantage of the magnetometer of the present invention that it can be operated at excitation frequencies higher than were before possible. Another advantage is that magnetic fields varying in time comparable to the excitation field frequency can be detected so that the sensitivity of the instrument is not dependent on the frequency of the field to be detected, providing its frequency is below the excitation frequency. It follows that ambient fields varying at high frequencies can be measured. Also, the sensitive axes of the detecting elements are more accurately defined than in the prior art devices. In view of the thinness of the films forming the magnetometer cores, the tendency is for the magnetization to rotate uniformly. Barkhausen noise is thus considerably reduced.

Having thus described the invention, certain modifications may become apparent to one skilled in the art and the appended claims are not intended to limit the invention only to the specific illustrations hereinbefore set forth but to embrace all obvious modifications within the spirit and scope of the invention.

What is claimed is:

1. Means for measuring the intensity of an ambient magnetic field comprising a thin planar film of ferromagnetic material, said film being uniaxially anisotropic, a winding about the film having an axis in the plane of said film, means for producing an alternating magnetic field through the film in the plane thereof to generate an alternating current in said winding, said alternating current having a characteristic which varies with the intensity of the ambient magnetic field in a predetermined direction in the plane of the film, the direction of the alternating magnetic field being orthogonally related to the direction of the ambient magnetic field and one of said fields being perpendicular to the anisotropic axis of the film, and means coupled to said winding for detecting variations in the characteristic of said alternating current in response to variations of the ambient magnetic field in said predetermined direction in the plane of the film.

2. Means for measuring the intensity of an ambient magnetic field in accordance with claim 1 in which the alternating magnetic field is in the direction of the anisotropic axis of the film and normal to the axis of the winding to generate an alternating current therein of a frequency which is an even harmonic of the frequency of the alternating magnetic flux and of an amplitude proportional to the intensity of the ambient magnetic field in a direction normal to the anisotropic axis of the film.

3. Means for measuring the intensity of an ambient magnetic field in accordance with claim 1 in which the alternating magnetic field is in a direction normal to the anisotropic axis of the film and to the axis of the winding to generate in said winding an alternating current of a frequency which is an even harmonic of the alternating magnetic flux frequency and of an amplitude proportional to the intensity of the ambient magnetic field in the direction of the anisotropic axis of the film.

4. Means for measuring the intensity of an ambient magnetic field according to claim 1 in which the material of the film is a nickel-iron alloy having a thickness no greater than of the order of $10^{-4}$ cm.

5. Means for measuring the intensity of an ambient magnetic field according to claim 1 in which the material of the film is a nickel-iron alloy having a thickness no greater than of the order of $10^{-4}$ cm., and a thin non-magnetic substrate to which the film is secured.

6. Means for measuring the intensity of an ambient magnetic field according to claim 1, a non-magnetic substrate, said film being a nickel-iron alloy material deposited on said substrate in the presence of a uniform magnetic field parallel to the plane of the film and having a thickness no greater than of the order of $10^{-4}$ cm.

7. Means for measuring the intensity of an ambient magnetic field according to claim 6 wherein said alloy comprises approximately 82% nickel and 18% iron.

8. A magnetometer comprising a plurality of thin planar ferromagnetic films, each of said films being uniaxially anisotropic in the plane thereof, means for mounting said films with their anisotropic axes in mutually orthogonal relation, a winding about each film having an axis in the plane thereof and normal to the anisotropic axes, an oscillator coupled to each winding and having a frequency determining tank circuit including the winding, each of the tank circuits being resonant at a predetermined reference frequency in the absence of an ambient magnetic field in the plane of the respective film and in the direction of its anisotropic axis, the permeability of each film being variable in accordance with variations of the intensity of a magnetic field in its plane and in the direction of its anisotropic axis to vary the frequency of the tank circuit, and means for detecting changes in the oscillator frequency and providing an output dependent on the change of frequency of the tank circuit from the reference frequency.

9. A magnetometer in accordance with claim 8, and including means coupled to the detectors for computing the intensity of the ambient magnetic field.

10. A magnetometer comprising a plurality of thin planar ferromagnetic films, each of said films being uniaxially anisotropic in the plane thereof, means for mounting said films with their anisotropic axes in mutually orthogonal relation, means for producing an alternating magnetic flux through each of the films in their respective planes and at a predetermined frequency, a winding about each film having its axis in the plane of its respective film and in a direction normal to the direction of the alternating magnetic flux through the film, one of said directions being along the anisotropic axis of the respective film such that an alternating voltage of an even harmonic frequency of the alternating magnetic flux is induced in said winding and of an amplitude dependent on the intensity of the magnetic field along the axis of the winding and in the plane of the respective film, means for amplifying said alternating voltage, and means responsive to the operation of said last mentioned means for indicating said amplified alternating voltage.

11. A magnetometer in accordance with claim 10 in which the direction of the alternating magnetic flux is along the anisotropic axis of each film.

12. A magnetometer in accordance with claim 10 in which the direction of the alternating magnetic flux is normal to the anisotropic axis of each film.

13. A magnetometer in accordance with claim 10 including a filter for passing only the alternating voltage of an even harmonic frequency coupled to each of the windings and means for indicating the amplitudes of the even harmonic voltage induced in each of the windings.

14. A magnetometer in accordance with claim 10 including means coupled to the outputs of said amplifying means for computing the intensity of the ambient magnetic field.

15. Means for measuring the intensity of an ambient magnetic field that comprises:
(a) a thin film of ferromagnetic material shaped to define the surface of a general cylinder;
(b) said film being characterized by being uniaxially anisotropic with the anisotropy axis being in the plane of the film;
(c) a winding encircling said thin film, the axis of said winding being parallel to the axis of said general cylinder;
(d) means to produce an alternating magnetic field in the plane of said film and normal to the axis of said winding;
(e) the voltage induced in said winding having a characteristic which varies as a function of the intensity of the component of said ambient magnetic field in the plane of said film parallel to the axis of said general cylinder; and
(f) means for detecting a parameter which is characteristic of the voltage induced in said coil and indicating the intensity of said component of said magnetic field.

16. Means for measuring the intensity of an ambient magnetic field that comprises:
(a) a field sensitive element;
(b) said field sensitive element including:
(1) a substrate having a surface shaped to define the surface of a general cylinder;
(2) a film of magnetic material formed on at least a portion of said surface of said substrate;
(3) said film being characterized by being uniaxially anisotropic along an axis in the plane of said film;
(c) a pick-up coil encircling said field sensitive element with the axis of said pick-up coil parallel to said axis of said general cylinder;
(d) means for inducing an alternating field in the plane of said film and normal to the axis of said pick-up coil;
(e) the voltage induced in said coil having a parameter which varies as a function of the intensity of a component of said ambient magnetic field lying in the plane of said film and parallel to the axis of said pick-up coil; and
(f) means coupled to said pick-up coil for detecting the parameter of said voltage produced responsive to the presence of said component of said ambient magnetic field and indicating the intensity of same.

17. Means for measuring the intensity of an ambient magnetic field according to claim 16 wherein said substrate defines a right circular cylinder.

18. Means for measuring the intensity of an ambient magnetic field according to claim 17 wherein said means for inducing a magnetic field comprises a conductor positioned along the axis of said right circular cylinder and a source of alternating current connected to said conductor.

19. Means for measuring the intensity of an ambient magnetic field according to claim 18 further including a shield member of conductive material surrounding said field sensitive element and means electrically connecting said conductor to said shield member.

20. Means for measuring the intensity of an ambient magnetic field according to claim 16 wherein said substrate is of planar configuration.

21. A magnetometer that comprises:
(a) a plurality of field sensitive elements;
(b) each of said field sensitive elements including:
(1) a substrate having a surface shaped to define the surface of a general cylinder;
(2) a film of magnetic material formed on at least a portion of said surface of said substrate;
(3) said film being characterized by being uniaxially anisotropic along an axis in the plane of said film;
(c) means for mounting said elements with their anisotropic axis in mutually orthogonal relation;
(d) a pick-up coil about each element having an axis parallel to the axis of said general cylinder;
(e) detector means connected to each of said pick-up coils for detecting variations in a magnetic parameter which is characteristic of each of said elements responsive to the application of a component of an ambient magnetic field in the plane of said film and parallel to the axis of said general cylinder; and (f) means responsive to the operation of said detector means for indicating the intensity of said component of the ambient magnetic field.

22. Means for measuring the intensity of an ambient magnetic field according to claim 21 wherein the anisotropic axis of each film is normal to the axis of the respective pick-up coil and each of said detector means comprises:

(a) an oscillator coupled to one of the pick-up coils and having a frequency determining tank circuit including said pick-up coil;

(b) said tank circuit being resonant at a predetermined frequency in the absence of an ambient magnetic field in the plane of the respective film and parallel to its anisotropic axis;

(c) the permeability of said respective film being variable in accordance with variations in the component of the magnetic field in its plane and parallel to its anisotropic axis to vary the resonant frequency of the tank circuit.

23. Means for measuring the intensity of an ambient magnetic field according to claim 21 further including means coupled to the last named means for computing the intensity of said ambient magnetic field.

24. Means for measuring the intensity of an ambient magnetic field according to claim 21 wherein each of said detector means comprises means for producing an alternating magnetic field through one of said films in the plane thereof and normal to the axis of said pick-up coil to induce an alternating voltage of an even harmonic of the frequency of the alternating magnetic field in said pick-up coil, the amplitude of said alternating voltage being a function of the intensity of the component of the ambient magnetic field in the plane of said film and parallel to the axis of said pick-up coil.

25. Means for measuring the intensity of an ambient magnetic field according to claim 24 wherein said detector means further includes amplifier means tuned to the frequency of said alternating voltage.

26. Means for measuring the intensity of an ambient magnetic field according to claim 25 further including means coupled to the outputs of said amplifier means for computing the intensity of the ambient magnetic field.

27. Means for measuring the intensity of an ambient magnetic field according to claim 21 wherein said anisotropic axis is normal to the axis of said general cylinder.

28. Means for measuring the intensity of an ambient magnetic field according to claim 21 wherein said anisotropic axis is parallel to the axis of said general cylinder.

29. Means for measuring the intensity of an ambient magnetic field according to claim 21 wherein said plurality of field sensitive elements consist of three.

No references cited.

RICHARD B. WILKINSON, *Primary Examiner.*

RUDOLPH V. ROLINEC, *Examiner.*